Aug. 4, 1942.     A. R. HEISE     2,292,271

HAND TOOL

Filed Dec. 5, 1941

Inventor

Arthur R. Heise

By Rockwell & Burkholder

Attorneys

Patented Aug. 4, 1942

2,292,271

UNITED STATES PATENT OFFICE 2,292,271

HAND TOOL

Arthur R. Heise, Woodbridge, Conn., assignor to The William Schollhorn Company, New Haven, Conn., a corporation of Connecticut Application December 5, 1941, Serial No. 421,720

8 Claims. (Cl. 30—252)

This invention relates to hand tools, and more particularly to a tool for use in cutting sheet metal, and as shown is in the form of a hand shear provided with a powerful leverage so that it may readily be hand operated.

In the cutting of sheet metal it is often desirable to be able to cut along a curved line as well as along a straight path, and it is also advantageous to have the tool so arranged that it may shear the metal along either a right- or a left-hand curve with equal facility.

In the past, hand tools have been constructed which are devised to cut sheet metal in a curve, but usually such tools are made so that they will cut along a path curved in one direction only. That is, the jaws of one tool are so arranged that they will cut a right-hand curve, for example, and it is necessary to provide a separate tool to cut a left-hand curve. Such tools are often sold in pairs so that the user may use one tool or the other, depending upon the kind of curve he desires to cut, and the same tool cannot be used to cut a curve in either direction.

One object of the present invention is to provide a hand shear for sheet metal of such a construction that the operator may with equal facility cut along a path curved in either direction.

A still further object of the invention is the provision of a hand tool which may be employed to cut sheet metal in either a right- or left-hand curve, as desired, without twisting or distorting the metal.

A still further object of the invention is the provision of a hand tool of the character described, wherein a high leverage exists between the handles and the jaws such that a relatively great amount of power can be applied to the jaws.

A still further object of the invention is the provision of a hand shear for sheet metal work, the jaws of which are of identical form and symmetrically arranged so that the shear may cut with equal facility along either a right- or left-hand curve without distorting the metal and without changing the position of the shear in the hand of the operator.

To these and other ends the invention consists in the novel features and combinations of parts to be hereinafter described and claimed.

Figure 1:
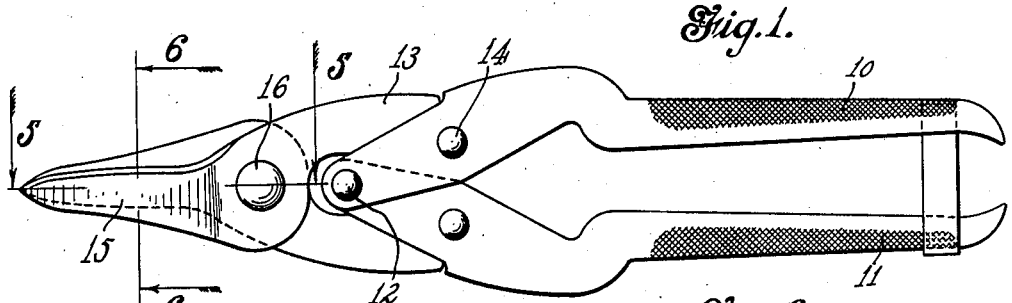
Fig. 1 is a side elevational view of a hand tool embodying my improvements, the jaws of the tool being shown in closed position.

To illustrate a preferred embodiment of my invention, I have shown a hand tool comprising handle members 10 and 11 pivoted at 12, to the forward ends of which are pivoted the working members or jaws of the tool. These jaws are precisely identical in form, and symmetrically arranged with respect to the handle members so that the description of one thereof will suffice.

Each of these members comprises a shank portion 13 pivoted to the adjacent handle member at 14, and a jaw portion generally designated by the numeral 15, the two jaws being in turn pivoted together by the pivot pin 16. A spring 17', coiled about the pivot pin 12 and acting at its ends against the end portions of the shank members 13, serves to urge the handle members to open or extended position, and likewise urge the jaws to open position.

It will be seen that the arrangement described gives a compound leverage to the tool, about the pivot points 12 and 16, the leverage being greater, of course, the closer the cut is being made to the pivot 16.

Figure 6:
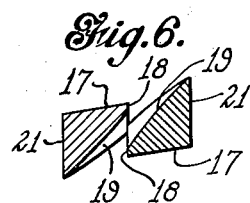
Fig. 6 is a transverse sectional view on line 6—6 of Fig. 1.
Figure 7:
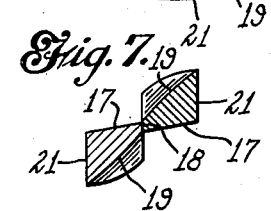
Fig. 7 is a transverse sectional view on line 7—7 of Fig. 3, the section being taken at the point at which the jaws are in cutting engagement.

As stated above, the two jaws are of identical shape, and while symmetrically arranged with respect to the handles, may be said to be oppositely arranged with respect to each other. In cross section the jaws may be said to be of substantially triangular form, each of them being provided with a shearing surface 17, which, as shown in Figs. 6 and 7, is substantially flat transversely of the longitudinal dimension of the blade. Cutting faces 18 are provided, these cutting faces being of narrow width and being arranged in a vertical plane at the meeting edges of the shearing faces 17. As shown more particularly in Figs. 1 and 3, the shearing faces 17 are curved longitudinally so that, while substantially flat or plane in a transverse direction, they are curved or arc-shaped in a longitudinal direction.

Figure 4:
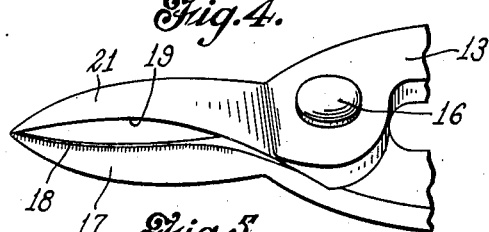
Fig. 4 is a perspective view of the jaws of the tool.
Figure 5:
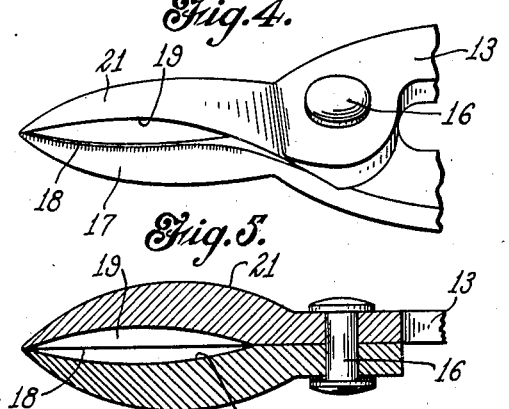
Fig. 5 is a sectional view on line 5—5 of Fig. 1.

The inner face of each jaw, designated at 19, is also substantially flat as regards its transverse dimension, and may even be slightly convex, as shown in the sectional views of Figs. 6 and 7. A clearly shown, however, in Figs. 4 and 5, the inner surface 19 of each blade is concave or dished so as to provide a clearance space for the two sections of metal, one on each side of the line of cut.

Figure 2:
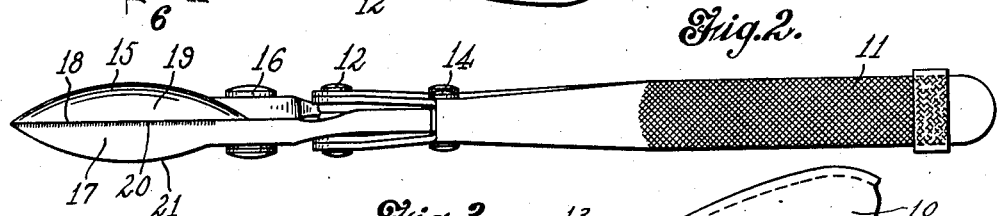
Fig. 2 is a top plan view of the tool.
Figure 3:
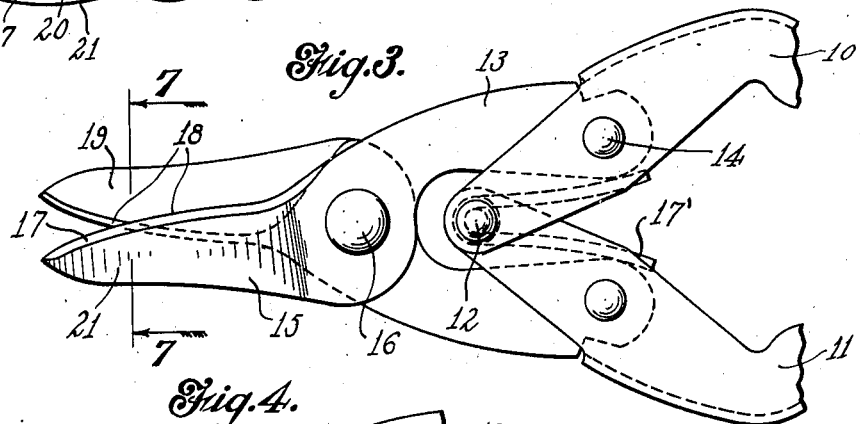
Fig. 3 is an enlarged detail view of the forward portion of the tool, with the jaws shown in partly opened position.

The longitudinal curved configuration of the outer or shearing surfaces of the blades provides that the cutting edge 18 will also be curved, as shown, for example, in Fig. 3, with respect to a horizontal line through the pivots 12 and 16 in that figure. These edges, however, as shown in Fig. 2, lie in a plane through the center of the tool, taken at right angles to the pivots 16 and 12.

It will be seen from the above that the surface 17 of each blade is substantially straight or flat along its shorter dimension, but convexly curved along its longer dimension, while the inner surfaces 19 are slightly convex along their shorter dimensions but dished or concave along their longer dimensions to allow clearance for the material.

The jaws of the tool, being identical in shape and symmetrically arranged with respect to the handles, will cut in either direction with equal facility. Also there is no "up" or "down" to the shears, as either of the handles may be held by the fingers or against the thumb however the tool happens to be grasped.

It will be noted that when a right-hand curve is being cut the tool will tend to lie below the sheet, so that the material on the convex side of the cutting line will enter the clearance space in the concave face 19 of the lower jaw, while when a left-hand curve is being cut the tool will have a tendency to ride above the sheet so that the convex side of the cut may have clearance along the concave face of the upper jaw.

The shearing surfaces of the jaws are preferably provided with narrow serrated cutting or gripping edges 20, which prevent the metal from pushing away from the operator when the tool is in use. As shown, the rear surface 21 of each jaw portion is of longitudinally convex form, so that each of the three cross-sectional dimensions of the jaws progressively increases in size from the tip inwardly. The narrow cutting faces 18, however, are of substantially the same width throughout their length, these faces standing at substantially right angles to the shearing faces 17.

It will be understood that, although the invention has been described as relating particularly to a shear for the purpose of cutting relatively stiff material such as sheet metal, it may also be applied to shears for other purposes, such as cutting cloth, for example. That is, blades of the same form and configuration as shown in the present application may be employed on cloth-cutting shears so as to cut either right or left curves, or cut in a straight line, just as described heretofore in connection with sheet metal.

While I have shown and described a preferred embodiment of my invention, it will be understood that it is not to be limited to all the details shown, but is capable of modification and variation within the spirit of the invention and within the scope of the claims.

What I claim is:

1. A hand tool for cutting sheet metal, said tool comprising a pair of pivoted handle members, jaw members pivoted respectively to the handle members for operation thereby, said jaw members being provided with substantially identical jaw portions, each of said jaw portions having a shearing face and a clearance face, and said shearing faces being substantially flat in a direction transversely to their lengths and convex in a longitudinal direction to provide a curved cutting edge.

2. A hand tool for cutting sheet metal, said tool comprising a pair of pivoted handle members, jaw members pivoted respectively to the handle members for operation thereby, said jaw members being provided with substantially identical jaw portions, each of said jaw portions having a shearing face and a clearance face, and said shearing faces being substantially flat in a direction transversely to their lengths and convex in a longitudinal direction to provide a curved cutting edge, and said clearance faces being of concave form along the longitudinal dimension of the jaw to provide clearance for the material on each side of the line of cut.

3. A hand tool for cutting sheet metal, said tool comprising a pair of pivoted handle members, jaw members pivoted respectively to the handle members for operation thereby, and said jaw members being provided with substantially identical jaw portions, each of said jaw portions having a shearing face and a clearance face, which faces are progressively wider from the free end of the jaw inwardly, and each of said shearing faces being convexly curved along its longitudinal dimension and substantially flat along its transverse dimension.

4. A hand tool for cutting sheet metal, said tool comprising a pair of pivoted handle members, jaw members pivoted respectively to the handle members for operation thereby, and said jaw members being provided with substantially identical jaw portions, each of said jaw portions having a shearing face and a clearance face, which faces are progressively wider from the free end of the jaw inwardly, and each of said shearing faces being convexly curved along its londitudinal dimension and substantially flat along its transverse dimension and having cooperating serrated cutting edges.

5. A hand tool for cutting sheet metal, said tool comprising a pair of pivoted handle members, jaw members pivoted respectively to the handle members for operation thereby, and said jaw members being provided with substantially identical jaw portions, each of said jaw portions having a shearing face and a clearance face, which faces are progressively wider from the free end of the jaw inwardly, and each of said shearing faces being convexly curved along its longitudinal dimension and substantially flat along its transverse dimension, said clearance faces being of concave form longitudinally of the jaws, and each of said jaws having a narrow cutting face at the junction of the clearance and shearing faces and at substantially right angles to the latter.

6. A hand tool for cutting sheet metal, said tool comprising a pair of pivoted handle members, jaw members pivoted respectively to the handle members for operation thereby, and said jaw members being provided with substantially identical jaw portions, each of said jaw portions being of substantially triangular shape in cross section and increasing progressively in cross-sectional size from their free ends inwardly, and said jaws having cooperating longitudinally convex shearing surfaces and longitudinally concave clearance surfaces, said surfaces being joined by the cutting edges of the tool.

7. A hand tool for cutting sheet metal, said tool comprising a pair of pivoted handle members, jaw members pivoted respectively to the handle members for operation thereby, said jaw members being provided with substantially identical jaw portions, each of said jaw portions being of substantially triangular shape in cross section and increasing progressively in cross-sectional size from their free ends inwardly, and said jaws having cooperating longitudinally convex shearing surfaces and longitudinally concave clearance surfaces, each of said jaws having a narrow cutting face joining the clearance and shearing faces thereof, and said cutting faces standing substantially at right angles to said shearing faces.

8. A hand tool for cutting sheet metal, said tool having a pair of pivoted handle members, a pair of jaw members pivoted to each other and having shank portions pivoted respectively to the handle members to provide a compound leverage, each of said jaw members having a shearing face, a clearance face, and a narrow cutting face at the junction of the first-named faces, said shearing face being of longitudinally convex form and said clearance face being of longitudinally concave form.

ARTHUR R. HEISE.